United States Patent [19]

Scobie et al.

[11] 4,410,163
[45] Oct. 18, 1983

[54] VALVE SEAT

[75] Inventors: William B. Scobie, Houston; Edward G. Holtgraver, Spring, both of Tex.

[73] Assignee: Keystone International, Inc., Houston, Tex.

[21] Appl. No.: 344,502

[22] Filed: Feb. 1, 1982

[51] Int. Cl.³ .............................................. F16K 1/22
[52] U.S. Cl. .................................... 251/306; 277/236
[58] Field of Search .............. 251/305, 306, 176, 173, 251/174; 277/236, 151, 157, 203, 204

[56] References Cited

U.S. PATENT DOCUMENTS

| | | | |
|---|---|---|---|
| 2,747,608 | 5/1956 | Grove | 251/358 |
| 3,077,331 | 2/1963 | Burtis | 251/173 |
| 3,077,332 | 2/1963 | Burtis | 251/173 |
| 4,005,848 | 2/1975 | Eggleston | 251/173 |
| 4,130,285 | 12/1978 | Whitaker | 251/173 X |
| 4,172,473 | 10/1979 | Lefere et al. | |
| 4,219,204 | 8/1980 | Pippert | 277/236 |
| 4,231,546 | 11/1980 | Eggleston et al. | 251/173 |

Primary Examiner—Arnold Rosenthal
Assistant Examiner—Sheri M. Novack
Attorney, Agent, or Firm—Browning, Bushman, Zamecki & Anderson

[57] ABSTRACT

A seat ring for a rotary valve assembly comprising a radially inner seal section for sealing engagement with a valve element, a radially outer retaining section for mounting the seat ring in a valve body, and an intermediate spacer section interconnecting the sealing and retaining sections. The spacer section has a convoluted radial run, and the sealing section has a multiplicity of circumferential windings of strands in surrounding relation thereto.

29 Claims, 7 Drawing Figures

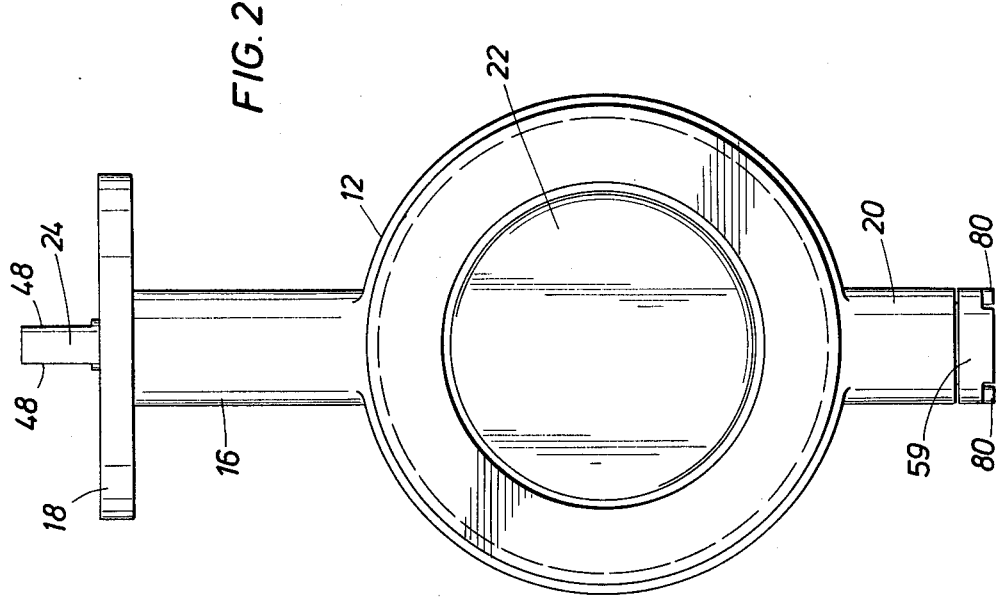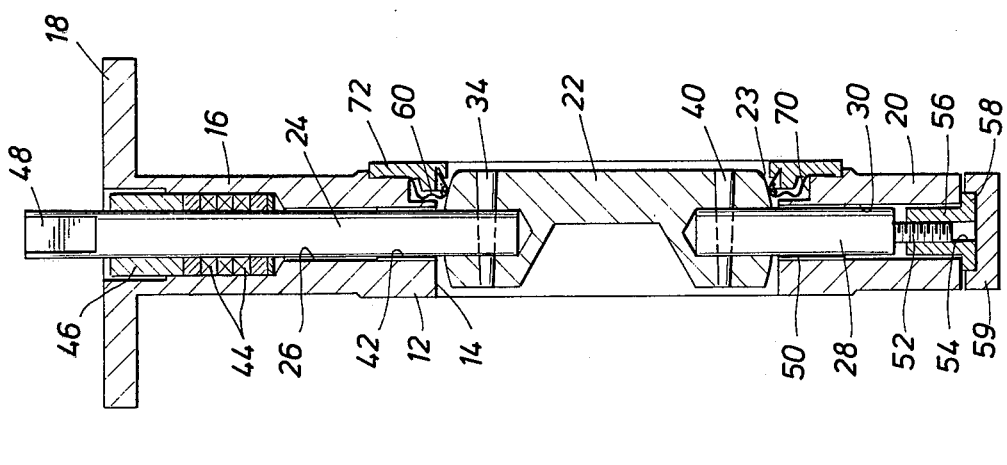

VALVE SEAT

BACKGROUND OF THE INVENTION

The present invention pertains to rotary valves, that is to valves in which a rotatable closure element is mounted in a flowway defined by the valve body so that it may be rotated between its open and closed positions. Examples of such valves are butterfly or disc valves, ball valves, plug valves, and the like. The valve body of such an assembly, which defines the fluid flowway, particularly in the case of a butterfly or disc valve, is typically provided with an annular seat or seal engageable with the periphery of the disc to seal against fluid leakage when the valve is closed. While, in some cases, such valve seats may be formed of elastomeric and/or polymeric materials, there are situations in which it is preferred to use a metallic seat or seal, e.g. because of the chemical and/or thermal environment in which the valve is to be used. In any event, such a seat must generally project slightly radially inwardly into the flowway when the valve is open so that, as the valve is closed, the seat will be expanded radially outwardly by the disc to form a tight seal therewith. Additionally, and perhaps even more importantly, when the valve is closed, the disc tends to travel in the axial direction when the pressure increases, and it is important that the seat also accommodate this movement while maintaining a fluid seal. If the valve element and the valve body undergo thermal expansion at different rates, the seat should be capable of accommodating the relative movement caused by such expansion. The seat must also be provided with "memory" so that, when the valve is reopened, the seat will assume its original position so that it will again form a tight seal the next time the valve is closed.

Metallic valve seats typically have some spring characteristics which tend to provide the aforementioned memory. However, in most instances, it is necessary to supplement these inherent properties of the seat. In the past, springs have been employed for this purpose. For example, a coil spring might be disposed in generally surrounding relation to the seat, or the sealing portion thereof, to provide memory.

Such prior devices suffer from several disadvantages. For example, when used at elevated temperatures, the conventional spring will lose spring temper and cease to properly perform its function of providing memory for the valve seat. Attempts to overcome these disadvantages, while still employing conventional springs, merely result in further complication of the device and undue expense.

SUMMARY OF THE INVENTION

In accord with the present invention, a rotary valve seat having a metallic sealing portion is provided with a multiplicity of circumferential windings of strands of material in surrounding relationship to the sealing section of the seat and radially outwardly thereof. These strands may be formed of a suitable metal with properties of elasticity and tensile strength such that, at some point in the travel of the closure element or disc to closed position, it will tend to expand the sealing section of the seat, and the surrounding windings, radially outwardly. Such expansion in turn sets up tensile stress in the windings. The stress generates a radially inward force resisting seat expansion and not only causing a tight disc-to-seat seal, but also causing the sealing portion of the seat to return to its original position when the valve is opened. In other words, the aforementioned windings provide memory for the seat. The force analysis is very similar to that involved in hoop stress in a thin pressure vessel subjected to internal pressure.

It is noteworthy that, in a metal-to-metal seated valve, the amount of radial expansion of the seat upon closing the valve is very small. Furthermore, where the metal seat body is of an inherently flexible thin-walled construction, it will not offer significant resistance to the disc movement until the latter is almost fully closed. However, the high tensile windings of the present invention are capable of being activated during the last 2°–3° of disc travel and of generating sufficient disc/seat interface pressure at that point, even though the amount of further radial expansion is extremely small.

The strand windings have a number of advantages over conventional spring-type memory devices. They simplify construction, allowing axial movement and providing radial spring without the need for a fixed reference point other than the valve seat itself. The windings of the present invention will continue to function as a memory means at high temperatures at which conventional springs would lose spring temper. Furthermore, it can be seen that the length of one winding is the same as the perimeter of the adjacent portion of the sealing section of the seat. Thus, both may be formed of materials of similar thermal coefficients of expansion so that they will expand at approximately the same rate, and the memory windings will remain effective at elevated temperatures. It is important to note that the windings provide radial force without resistance to axial seat travel. Thus, increasing line pressure can serve to energize the flexible thin metal seat for an enhanced sealing effect. Yet the windings still provide radial support and resist any tendency toward radial seat expansion caused by such axial movement.

Another salient feature of the present invention may best be understood by comparing the windings with a prior art solid backup ring of equivalent mechanical strength. Such a ring would cause point contact between the disc and seat, radial expansion being resisted at the point (or, strictly speaking, the annular line) of contact by the total capacity of the backup ring. The multiple windings of the present invention, on the other hand, conform to the thin metal seat configuration over a significant area and provide a progressively increasing disc/seat interface pressure as the disc approaches closed position and more and more windings are activated. This in turn eliminates a jamming problem associated with solid backup rings and also permits a greater margin for error in establishing the valve closed position.

The invention also comprises improvements in the configuration of the seat ring itself. In addition to the aforementioned sealing section, which contacts the valve element or disc, the ring includes a radially outer retaining section for mounting the ring in the valve body. Interconnecting these sealing and retaining sections is a spacer section, which includes a convoluted radial run. The convolutions in the radial run provide many advantages, among which are the fact that the seat may be made relatively thin and flexible, without danger of collapse at high pressures. Another advantage is the ability of the seat to accommodate uneven thermal expansion of the disc and valve body.

The spacer section of the seat preferably also comprises an axial run extending away from the radial run in the same general direction as the sealing section, but at the opposite end of the radial run. The retaining section in turn extends radially outwardly from the axial run of the spacer section, forming a pivot point at the intersection of the two. The pivoting action thus permitted allows the seat to move with the valve element to accommodate changes in the magnitude and/or direction of pressure application without loss of sealing effect. To further enhance this effect, the sealing section of the seat has a free end which, while preferably partially restrained by a suitable formation on the valve body, is permitted limited radial and axial movement. The valve body may also be provided with stop means for further limiting the axial and radial movements of the thin metal valve seat.

Accordingly, it is a principal object of the present invention to provide an improved metallic-type seat for a rotary valve assembly.

It is another object of the present invention to provide an improved valve assembly incorporaating such a seat.

A further object of the present invention is to provide such a valve assembly and/or seat in which memory is provided by a multiplicity of circumferential windings of strands of material in surrounding relation to the sealing section of the seat.

Still another object of the present invention is to provide an integral, flexible, seat ring having a convoluted radial run.

Still other objects, features, and advantages of the present invention will be made apparent by the following detailed description of a preferred embodiment, the drawings, and the claims.

BRIEF DESCRIPTION OF THE DRAWINGS

FIG. 1 is a longitudinal cross-sectional view of a disc valve assembly according to the present invention, showing the disc in closed position.

FIG. 2 is an elevational view taken at right angles to FIG. 1.

DETAILED DESCRIPTION

Figure 3:
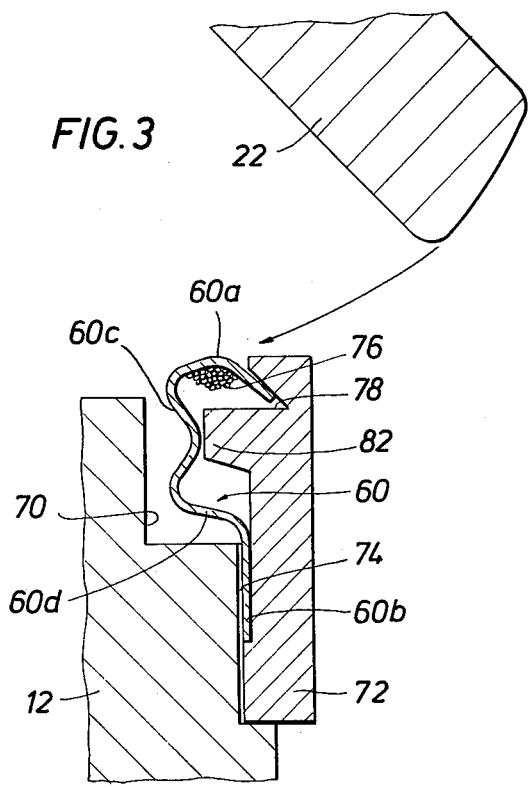
FIG. 3 is an enlarged, detailed, sectional view through the seat ring, showing the disc intermediate its open and closed positions.

While the invention will be described with particular reference to a butterfly or disc valve, it is to be understood that it is not so limited. The valve seat described herein may be employed in any valve assembly having a rotatable valve closure element such as, for example, a ball valve, a plug valve, etc.

Referring first to FIG. 1, there is shown a butterfly valve 10 having a generally annular body 12 with a fluid flow passage 14 therethrough. The valve body 12 is typically adapted for positioning between opposed, pipe flanges (not shown). Extending outwardly from valve body 12 is a cylindrical neck 16 integrally formed with body 12. A flange 18 formed on neck 16 provides a means for securing an actuator (not shown) to valve 10. Diametrically opposite neck 16 and protruding from body 12 is a boss 20.

Pivotably supported in fluid flow passage 14 is a fluid control disc 22 having a peripheral sealing surface 23, surface 23 being radiused. Disc 22 is supported by means of a first stem 24 positioned in a bore 26 of neck 16 and a second stem 28 positioned in a bore 30 of boss 20. Stem 24 is connected to disc 22 by means of pin 34. Similarly, stem 28 is connected to disc 22 by means of pin 40.

Stem 24 is journalled in bore 26 by means of bushing 42. Fluids are prevented from escaping from valve 10 through bore 26 by means of packing rings 44, which are held in position by means of a packing gland 46. The upper end of stem 24 protrudes above circular flange 18 and is provided with opposed flats 48 to provide a means for securing a hand wheel, wrench, or other device by an actuator, for rotating disc 22 to open and close the valve 10.

Stem 28 is journalled in bore 30 by means of a bushing 50. Stem 28 also has an integral stub shaft 52 projecting from its lower end which is threaded and received in a threaded bore 54 in a locator sleeve 56. Locator sleeve 56 has a flange 58 clamped between the end of boss 20 and a cover plate 59 to prevent movement of locator sleeve 56 in bore 30. Locator sleeve 56 maintains disc 22 in proper position along the axis of stem 24 and stem 28. As indicated, locator sleeve 56 is held in place by means of cover plate 59 which is secured via bolts 80 to boss 20 and counterbored to receive flange 58.

Sealing between disc 22 and body 12 around the periphery of fluid flow passage 14 is provided by means of an annular seat, shown generally as 60, and described more fully below. Seat 60 is positioned in a counterbore 70 in one face of body 12. In addition to the body proper 12, the valve body means of the assembly include an annular retainer plate 72 secured in any suitable manner to the axial face of body proper 12 generally in opposed relation to counterbore 70.

Referring now to FIG. 3, the seat 60 and related portions of the valve body means will be described in greater detail. The seat ring 60 comprises a relatively thin, somewhat flexible, integral metallic ring having a radially inner sealing section 60a and a radially outer retaining section 60b, interconnected by a spacer section having a convoluted radial run 60c as well as an axial run 60d. Sealing section 60a extends generally axially from the radially inner end of radial run 60c of the spacer section. The axial run 60d extends from the outer extremity of radial run 60c in generally the same axial direction as sealing section 60a. Retaining section 60b in turn extends radially outwardly from run 60d distal run 60c and into a retaining slot 74 defined between body 12 and plate 72. As shown, sealing section 60a is concave radially outwardly. Surrounding sealing section 60a within the concavity formed on the radially outer side thereof, are a multiplicity of circumferential windings of strands 76. Although preferably formed by a metallic wire having a thermal coefficient of expansion similar to that of the seat 60, strands 76 may be formed of any suitable material having sufficient elasticity and tensile strength to impart memory to sealing section 60a as described hereinbelow. In any event, the windings may comprise multiple turns of a single strand of material, or single turns of multiple strands of material, or some intermediate combination. In any event, the ends of the strand or strands are secured to one another and/or to seat 60 in any suitable manner. Sealing section 60a has its free end, i.e. the end distal run 60c, disposed in a complimentarily configured notch 78 in plate 72. Notch 78 permits limited axial and radial movement of section 60a.

Figure 4:
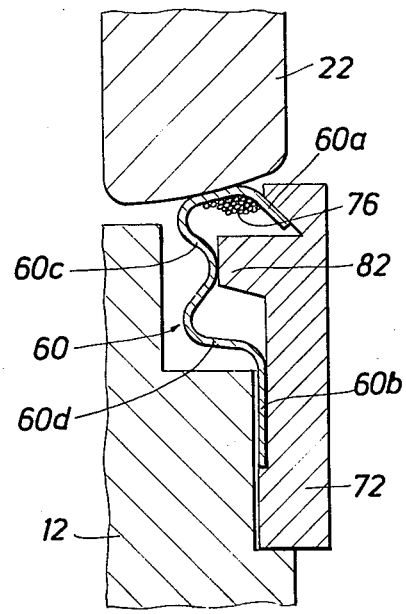
FIG. 4 is a view similar to FIG. 3 showing the disc in its closed position.

As the valve disc 22 moves from its open position to the closed position shown in FIG. 4, sealing section 60a will be expanded radially outwardly. This expansion is permitted by virtue of compression of the convolutions of run 60c (compare FIGS. 3 and 4) as well as by stretching of strands 76. The latter stretching sets up tensile forces in strands 76 which in turn impart a radially inward force on sealing section 60a causing it to seal tightly against disc 22 and also to return to the position of FIG. 3 if the valve is reopened.

Figure 5:
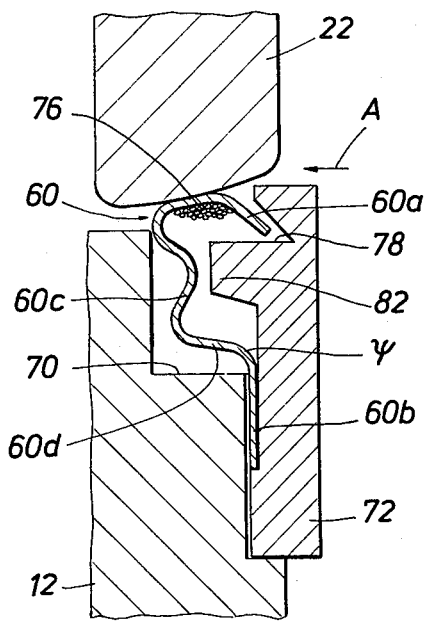
FIG. 5 is a view similar to that of FIG. 4 showing the positions of the parts upon application of fluid pressure from the right.

Referring to FIG. 5, the relative positions of the parts in the presence of fluid pressure acting in the direction of arrow A is illustrated. Pressure at A will tend to deflect disc 22 to the left, i.e. away from seat 60. Upon such deflection of disc 22, run 60c pivots axially about point x, at the intersection of the retaining section 60b and the axial run 60d of the spacer section. Thus, sealing section 60a can follow the movement of disc 22, while the tensile forces set up in strands 76 will cause section 60a to remain tightly sealed against the periphery of disc 22 but without resisting axial deflection. It can be seen that notch 78 permits the aforementioned movement, while remaining generally in alignment with or enclosing relation to the free end of section 60a. Thus, notch 78 may continue to prevent excessive radial deflection of seat 60. It should be noted that radial run 60c of the spacer section of seat 60 has a central convolution which is concave in one axial direction, to the left as shown, and convex in the opposite axial direction. This helps to impart elasticity to the thin metal structure.

Figure 6:
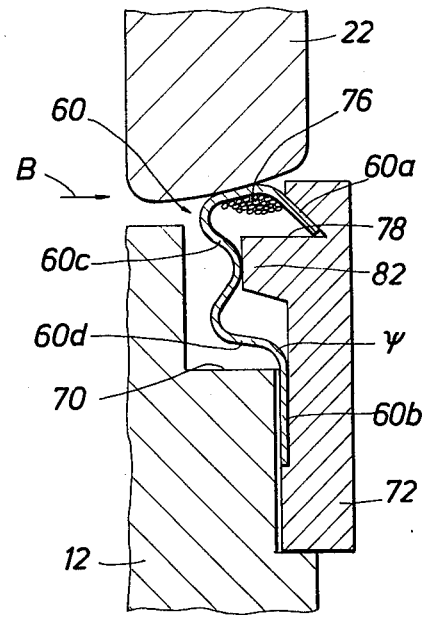
FIG. 6 is a view similar to those of FIGS. 4 and 5 showing the positions of the parts upon application of fluid pressure from the left.

Referring to FIG. 6, the positions of the parts upon the application of fluid pressure in the direction of the arrow B is shown. Disc 22 has been deflected in direction B, i.e. to the right, and sealing section 60a has been permitted to follow it, again by virtue of axial pivoting of the spacer section 60c, 60d, generally about point x. Again, a tight seal between section 60a and disc 22 is maintained by the radially inward force imparted by the tensioned strands 76. Excessive axial movement has been prevented by bottoming of the free end of section 60a in notch 78. The situation illustrated in FIG. 6, i.e. with pressure at B tending to move disc 22 toward seat 60, is the one which is most likely to cause collapse of seat 60 under extreme conditions. Such collapse is prevented by the convoluted configuration of run 60c, and of seat 60 in general, as well as by an axial projection 82 on retainer plate 72 which opposes and abuts the convex side of the central convolution of run 60c.

Strands 76, as mentioned, are preferably formed of a high tensile metallic material, which may have a thermal coefficient of expansion similar to that of seat 60. However, strands 76 may also be made of other materials such as nylon or other synthetic polymeric materials, thermoplastic or thermosetting in nature, provided they have the requisite qualities of elasticity and tensile strength to impart memory to sealing section 60a of the valve seat. The term "strand" as used herein is intended not only to include filaments or fibers, i.e. monofilaments, but also includes braided, twisted, or like configurations wherein several filaments are used to form a strand.

Figure 7:
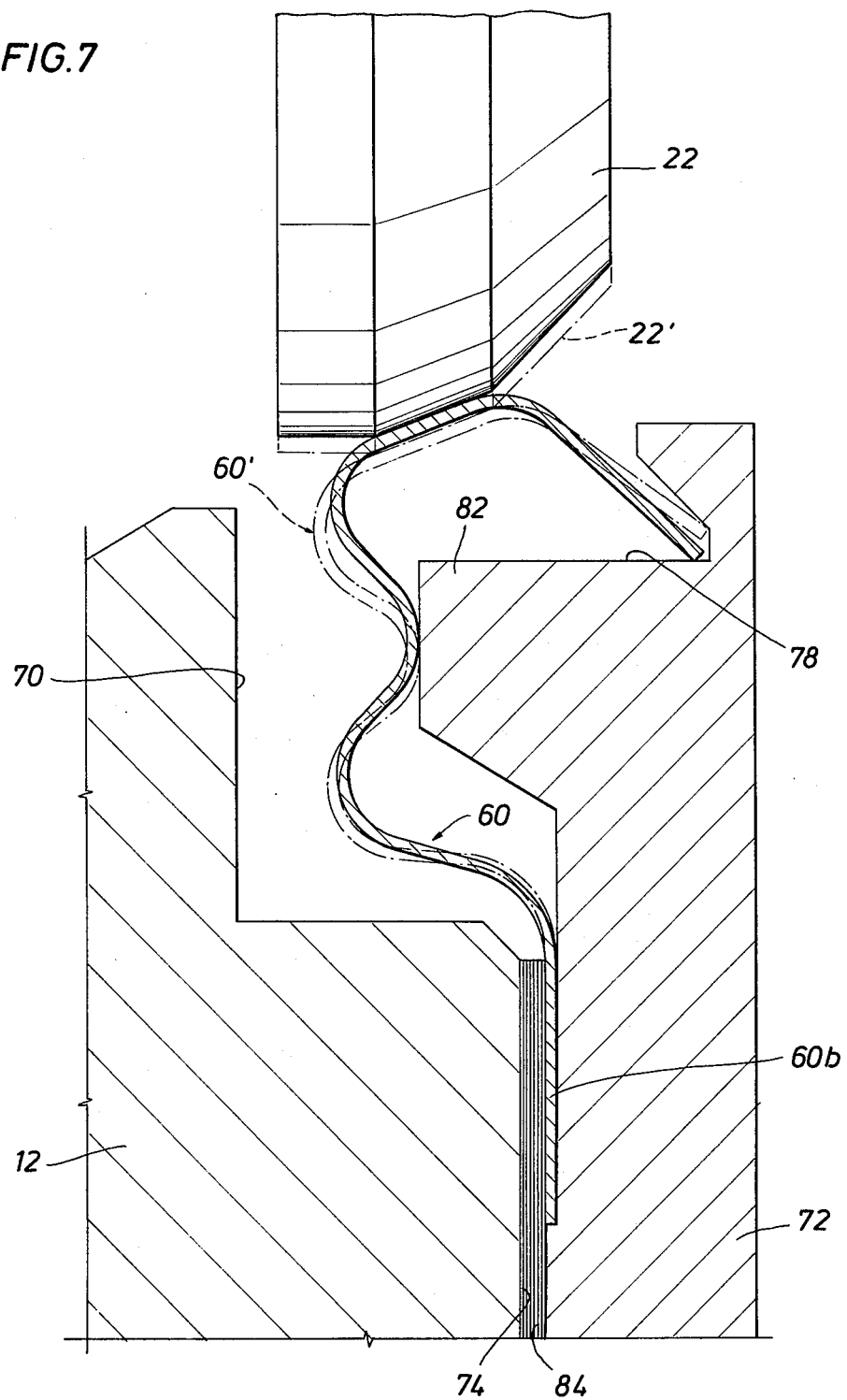
FIG. 7 is a further enlarged view showing relative positions of the parts before and after thermal expansion.

Referring now to FIG. 7, there is shown an even further enlarged view of the apparatus with disc 22 in closed position. In such position, the disc, seat ring, and windings will tend to expand thermally at a greater rate than the valve body. An initial position of the disc is shown in solid line at 22, with an expanded position being indicated in phantom at 22'. The valve body 12, 72, because it expands much more slowly, can, for purposes of the present discussion, be considered to have remained in a constant solid line as shown. The windings 76 have, for clarity of illustration, been deleted from FIG. 7. However, it should be understood that the seat 60 as well as the windings 76 will thermally expand at approximately the same rate as disc 22. Thus, the normal tendency of the windings 76 to resist mechanical radial expansion will, because the windings themselves have expanded, not unduly interfere with thermal expansion of the disc. However, because the seat ring 60 engages both disc 22 and body 12, 72, it must also deflect or change in configuration to accommodate the thermal expansion of disc 22. The above-described convoluted configuration of seat 60, and the play permitted its free end by notch 78, permits such deflection, as shown in phantom at 60', without loss of the fluid seal. Such seal will still be maintained by the correspondingly expanded windings (not shown). FIG. 7 also illustrates shin stop material gasket 84 which is interposed between the retaining section 60b of the seat ring and the adjacent face 74 of the valve body to firmly position section 60b in the valve body.

The foregoing represents only one preferred embodiment of the invention, and it will be understood that numerous modifications may suggest themselves to those skilled in the art. Accordingly, it is intended that the scope of the present invention be limited only by the claims which follow.

We claim:

1. A seat ring for a rotary valve assembly comprising:
   a radially inner metallic sealing section for sealing engagement with a valve element;
   a radially outer retaining section for mounting said seat ring in said valve assembly;
   and a multiplicity of circumferential windings of material in surrounding relationship to said sealing section of said seat ring, and radially outwardly thereof, each of said windings comprising an elongate strand of said material, each of said strands having its centerline oriented substantially circumferentially with respect to said sealing section for generally the full length of said winding.

2. The seat ring of claim 1 wherein said seat ring comprises an integral, flexible, metallic ring.

3. The seat ring of claim 1 wherein said strands are metallic.

4. The seat ring of claim 1 wherein said sealing section of said seat ring is concave radially outwardly, said windings being disposed in the concavity defined by said sealing section.

5. The seat ring of claim 4 wherein said sealing section defines an axially and radially movable free end.

6. The seat ring of claim 1 wherein said strands are formed of a metal having high tensile strength.

7. The seat ring of claim 1 wherein said windings are comprised of multiple turns of a single strand.

8. The seat ring of claim 1 wherein said windings are comprised of single turns of multiple strands.

9. The seat ring of claim 1 including an intermediate spacer section interconnecting said sealing and retaining sections.

10. The seat ring of claim 9 wherein said spacer section has a convoluted radial run.

11. The seat ring of claim 10 wherein said sealing section extends generally axially from said convoluted radial run of said spacer section.

12. The seat ring of claim 11 wherein said spacer section further comprises an axial run extending from said radial run in generally the same direction as said sealing section, said retaining section extending radially outwardly from said axial run distal said radial run.

13. The seat ring of claim 12 wherein said spacer section is generally axially pivotable at the intersection of said retaining section and said axial run of said spacer section.

14. A rotary valve assembly comprising:
valve body means defining a fluid flowway;
a valve element disposed in said flowway and rotatably mounted on said valve body for movement between an open position and a closed position;
a seat ring carried on said valve body and circumferentially surrounding said flowway for sealing engagement with said valve element in said closed position, said seat ring comprising a radially inner metallic sealing section projecting into said flowway for such sealing engagement with said valve element and a radially outer retaining section for mounting said seat ring in said valve assembly;
and a multiplicity of circumferential windings of material in surrounding relationship to said sealing section of said seat ring, and radially outwardly thereof, each of said windings comprising an elongate strand of said material, each of said strands having its centerline oriented substantially circumferentially with respect to said sealing section for generally the full length of said winding.

15. The valve assembly of claim 14 wherein said seat ring comprises an integral, flexible, metallic ring.

16. The valve assembly of claim 14 wherein said strands are metallic.

17. The valve assembly of claim 14 wherein said sealing section defines a free end axially and radially movable with respect to said valve body means.

18. The valve assembly of claim 14 wherein said strands are formed of a metal having high tensile strength.

19. The valve assembly of claim 14 wherein said windings are comprised of multiple turns of a single strand.

20. The valve assembly of claim 14 wherein said windings are comprised of single turns of multiple strands.

21. The valve assembly of claim 14 wherein said seat ring comprises an intermediate spacer section interconnecting said sealing and retaining sections.

22. The valve assembly of claim 21 wherein said spacer section has a convoluted radial run.

23. The valve assembly of claim 22 wherein said sealing section extends generally axially from said convoluted radial run of said spacer section.

24. The valve assembly of claim 23 wherein said spacer section further comprises an axial run extending from said radial run in generally the same direction as said sealing section, said retaining section extending radially outwardly from said axial run distal said radial run and into a retaining slot defined in said valve body means.

25. The valve assembly of claim 24 wherein said valve body means comprises a body proper and a retainer member secured to one axial side of said body proper, said retaining slot being defined between opposed faces of said body proper and said retainer member.

26. The valve assembly of claim 25 wherein said spacer section is generally axially pivotable at the intersection of said retaining section and said axial run of said spacer section.

27. The valve assembly of claim 26 wherein said valve body means defines a notch receiving and restraining the free end of said sealing section, but permitting limited axial and radial movement of said free end.

28. The valve assembly of claim 27 wherein said valve body means comprises stop means cooperative with said seat ring for limiting movement of said seat ring with respect to said valve body means.

29. The valve assembly of claim 28 wherein said radial run of said spacer section includes at least one convolution concave in one axial direction and convex in the other axial direction, and wherein said stop means comprises an axial projection formed on said valve body means opposite the convex side of said convolution.

* * * * *